Oct. 23, 1934.    L. F. NENNINGER ET AL    1,978,353
AUTOMATIC MILLING MACHINE
Filed March 7, 1932    8 Sheets-Sheet 1
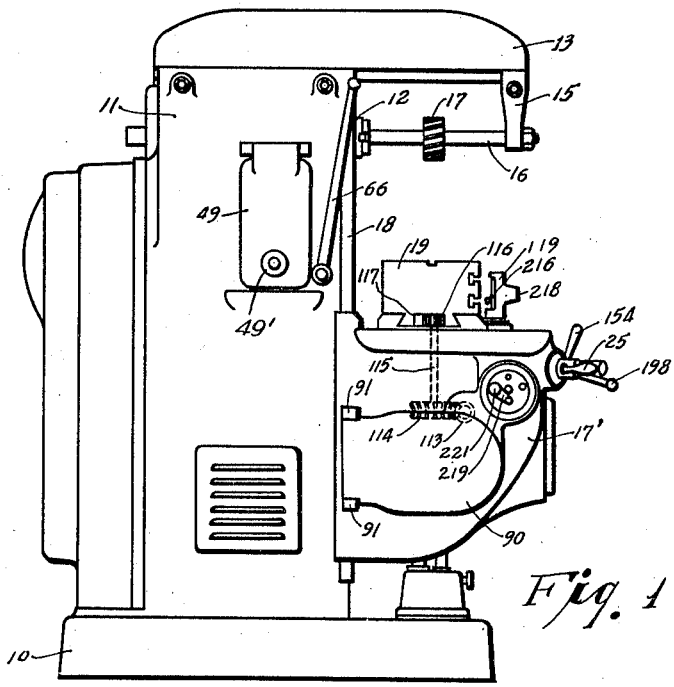
Fig. 1
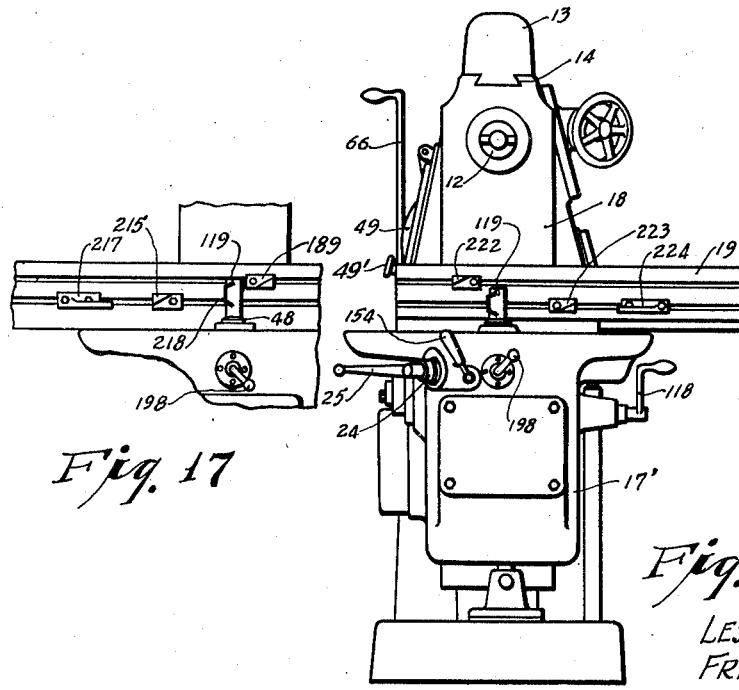
Fig. 17
Fig. 2
Inventors
LESTER F. NENNINGER
FRED A. HASSMAN
By HK Parsons
Attorney Oct. 23, 1934.                L. F. NENNINGER ET AL               1,978,353
                              AUTOMATIC MILLING MACHINE
                           Filed March 7, 1932         8 Sheets-Sheet 2

Inventors
LESTER F. NENNINGER
FRED A. HASSMAN

By A. K. Parsons
Attorney

Oct. 23, 1934.   L. F. NENNINGER ET AL   1,978,353
AUTOMATIC MILLING MACHINE
Filed March 7, 1932   8 Sheets-Sheet 4

Q.T. RIGHT
R.H. CYCLE

Inventors
LESTER F. NENNINGER
FRED A. HASSMAN

By AHK Parsons
Attorney

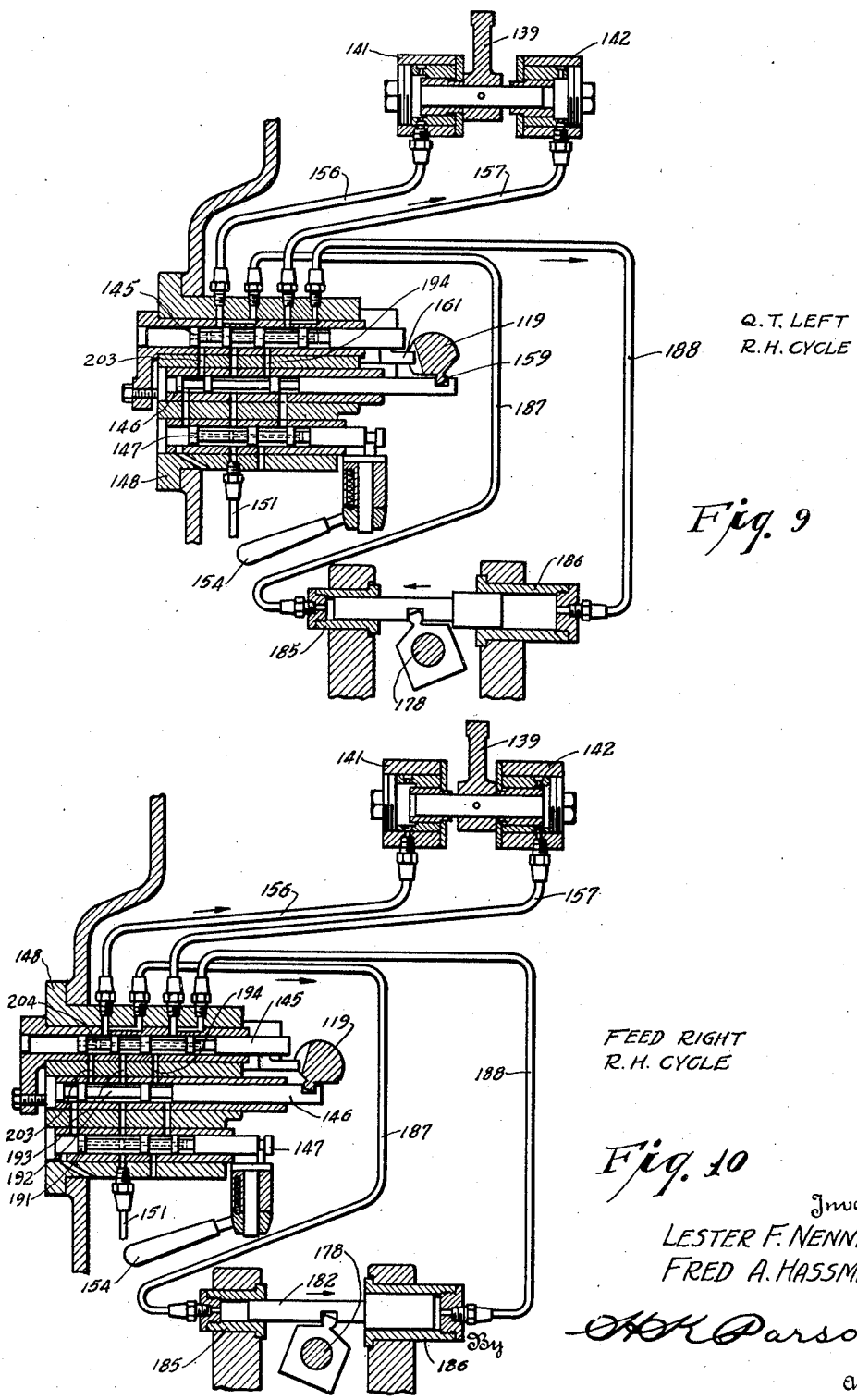

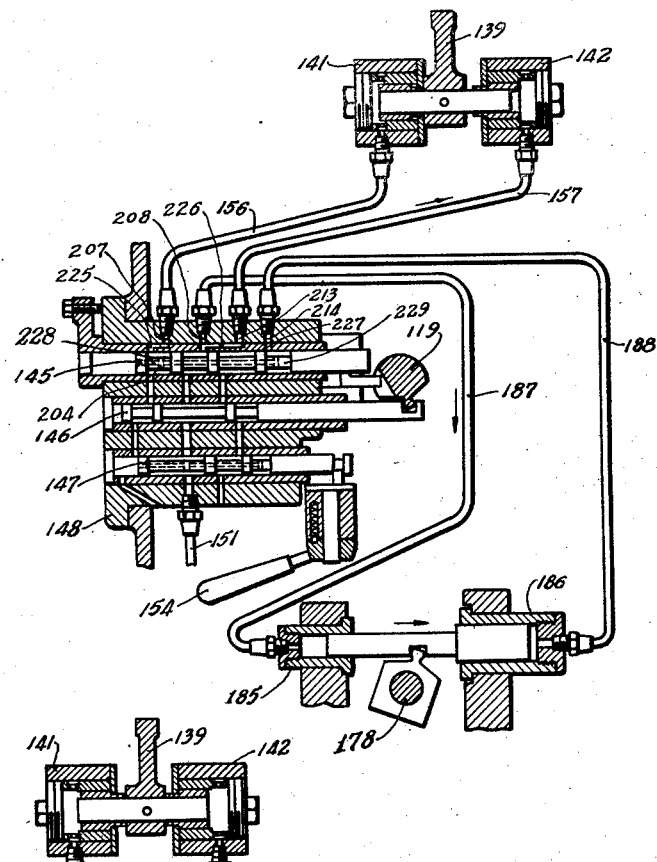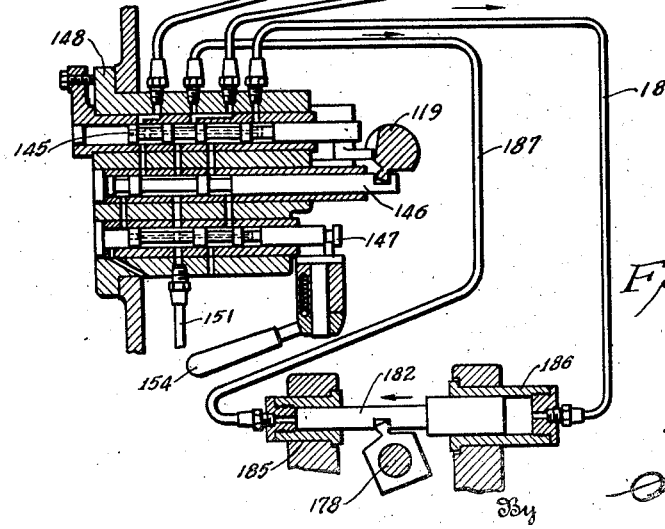

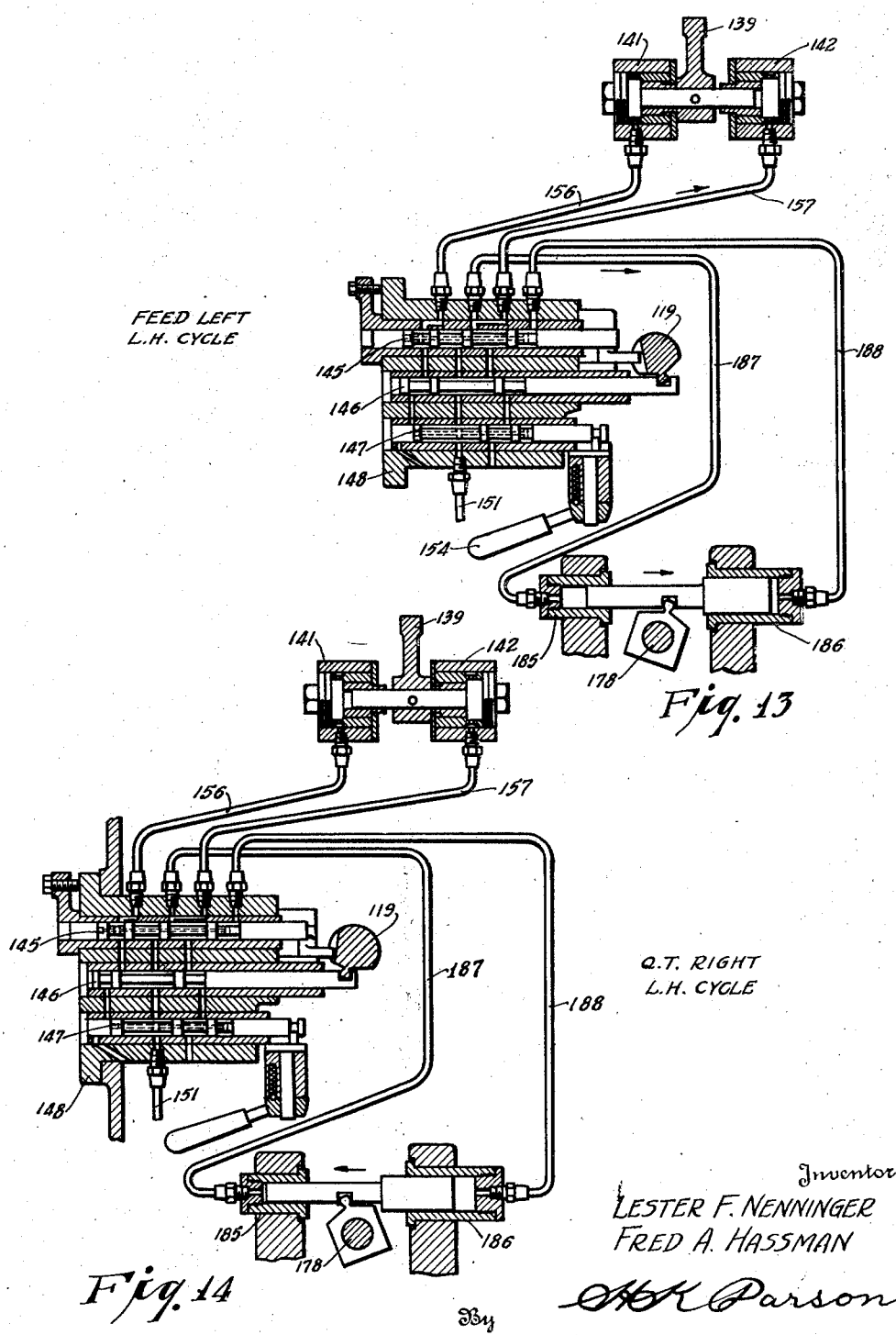

Oct. 23, 1934.  L. F. NENNINGER ET AL  1,978,353
AUTOMATIC MILLING MACHINE
Filed March 7, 1932  8 Sheets-Sheet 8

Inventors
LESTER F. NENNINGER
FRED A. HASSMAN
By AKParsons
Attorney

Patented Oct. 23, 1934

1,978,353

UNITED STATES PATENT OFFICE 1,978,353

AUTOMATIC MILLING MACHINE

Lester F. Nenninger and Fred A. Hassman, Cincinnati, Ohio, assignors to The Cincinnati Milling Machine Company, Cincinnati, Ohio, a corporaton of Ohio Application March 7, 1932, Serial No. 597,189

21 Claims. (Cl. 90—21)

This invention relates to milling machines and more particularly to improvements in transmission and control mechanism therefor.

One of the objects of this invention is to provide a simplified plain milling machine having selective automatic cycle control which will yield one-way cycles in either direction making possible the loading and operating of the machine from either end of the table which is of advantage when only a limited selection of cutters are available and the cycle must be chosen to suit the cutter.

A further object of this invention is to provide an improved transmission and control mechanism which combines mechanical and hydraulic operation to the best advantage whereby auxiliary power means may be utilized for the shifting members that are the more difficult to move and dog-actuated mechanical mechanism may be utilized for the more easily shifted members.

An additional object of this invention is to provide an improved transmission and control mechanism in combination with an automatic spindle stop whereby the spindle will be automatically stopped when the table is stopped either by manual or automatic means; and restarted upon movement of the table; and which will function automatically with either a right hand or a left hand cycle.

Other objects and advantages of the present invention should be readily apparent by reference to the following specification considered in conjunction with the accompanying drawings illustrative of one embodiment thereof, but it will be understood that any changes may be made in the specific structural details within the scope of the appended claims without departing from or exceeding the spirit of the invention.

Referring to the drawings in which like reference numerals indicate like or similar parts:

Figure 1 is a side elevation of a milling machine embodying the principles of this invention.

Figure 2 is a front view of the machine illustrated in Figure 1.

Figure 9 is a diagrammatic view showing the control mechanism in a quick traverse left position for a right hand cycle.

Figure 10 is a diagrammatic view of the control mechanism showing the parts in a feed right position for a right hand cycle.

Figure 11 is a diagrammatic view of the transmision control mechanism shown in a quick traverse left position for a left hand cycle.

Figure 12 is a view similar to Figure 11 showing the parts in a stop position for a left hand cycle.

Figure 13 is a view similar to Figure 11 showing the parts in a feed left position for a left hand cycle.

Figure 14 is a view similar to Figure 11 showing the parts in a quick traverse right position for a left hand cycle.

Figure 17 is a fragmentary front elevation showing the trip dogs set up for a right hand cycle.

Figure 3:
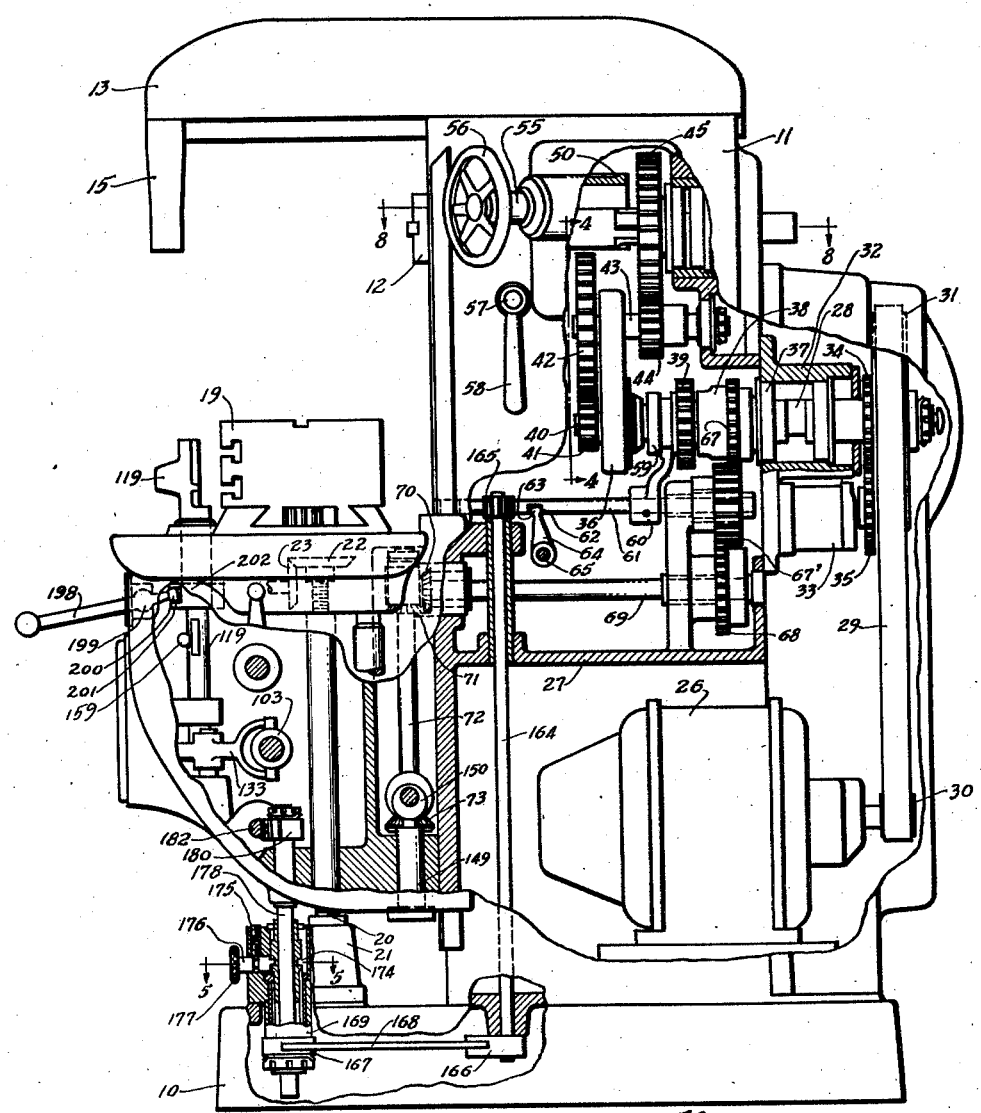
Figure 3 is a view partly in section of the opposite side of the machine illustrated in Figure 1 showing part of the transmission and control mechanism thereof.

In the drawings, the reference numeral 10 indicates the pedestal of a machine having an uprising column 11 mounted thereon for supporting a cutter spindle 12 in the upper part thereof. An overarm 13 is slidably mounted in guideways 14 formed on the top of the column which has attached to its outer end a pendant or arbor support 15 for journaling and supporting an arbor 16 bearing a cutter 17 for rotation by the spindle 12. A work support is provided comprising a knee 17' which is vertically adjustable upon guideways 18 formed on the front vertical face of the column, and a table 19 which is reciprocably mounted on the knee for movement transversely of the cutter spindle. This comprises a simplified work support suitable for plain milling operations, lateral adjustments between the cutter and work being provided for by a quill assembly to be described hereafter. An elevating screw 20, Figure 3, is journaled in the knee for engagement with a fixed nut 21 carried by the pedestal 10, the upper part of the screw having a bevel gear 22 keyed thereto in engagement with bevel gear 23 keyed to the end of a horizontal shaft 24. This shaft extends to the outside of the knee as shown in Figures 1 and 2 where it is provided with a manual operating lever 25. Rotation of the lever in one direction will therefore effect elevation of the knee while rotation in the opposite direction will cause a separation between work and cutter.

Figures 4, 5:
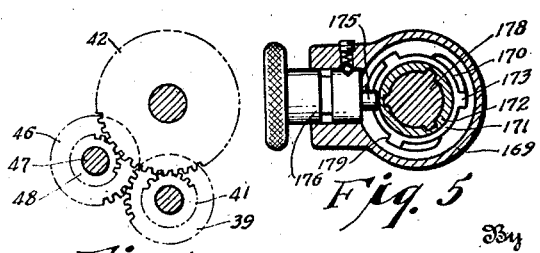
Figure 4 is a detail view on the line 4—4 of Figure 3.
Figure 5 is a section on the line 5—5 of Figure 3.

The cutter spindle is adapted to be power rotated by means of the following mechanism. A prime mover 26 is mounted in a motor chamber 27 formed in the lower part of the column and is connected to the main drive shaft 28 by means of a belt 29 passing around the motor pulley 30 and the shaft pulley 31. The shaft 28 is anti-frictionally journaled in a detachable housing 32 attached to the rear of the column which also has mounted therein a lubricating pump 33 which is driven from shaft 28 by means of gears 34 and 35. A second shaft 40 is journaled at one end in a bearing 36 formed in the interior of the column and at the other end is journaled in the end of shaft 28. Between bearing 36 and the anti-friction bearing 37 is mounted a friction clutch 38 having shiftable clutch spool 59 which is shiftable to the right as viewed in Figure 3 to couple the shaft 28 to the drive gear 39 and shaft 40. A change gear 41 is connected to the end of this shaft in mesh with change gear 42, these two gears constituting a rate changer and they may be reversed or other pairs substituted therefor to change the rate of rotation of the shaft 43 relative to the shaft 40. A gear 44 is secured to the shaft 43 in permanent mesh with the spindle drive gear 45 which is permanently connected to the cutter spindle. The gear 39 as shown in Figure 4 meshes with a pinion gear 46 on the jack shaft 47 which also carries gear 48 meshing with the gear 42. These intermediate gears on shaft 47 make it possible to change the direction of rotation of the spindle.

A door 49 pivoted to the side of the column as shown in Figures 1 and 2 has a handle 49' forming means for operating the door which permits easy access to these gears for changing the same. There has thus been provided a very simplified spindle transmission having a rate changer and reverser therein whereby the rate and direction thereof may be easily and quickly determined.

Since no lateral adjustment has been provided for the table 19, provision has been made for axially adjusting the cutter spindle and to this end the spindle 12 is journaled in a quill 50 having rack teeth 51 formed on its periphery engaged by the worm 52 which is rotatable by means of a pair of bevel gears 53 and 54, the latter being mounted on the end of shaft 55 carrying the hand wheel 56. The shaft 55 projects at an angle to the side wall of the column whereby the same may be easily rotated from the operator's position at the front of the machine. A quill clamp 57 having the manually operable handle 58 on the exterior of the column is provided for clamping the spindle and quill in any axially adjusted position.

The clutch spool 59 of the spindle starting clutch is engaged by a shifter fork 60 fixed to the shifter rod 61 which has a lateral notch 62 formed therein for receiving the ball shaped end 63 of crank arm 64. This crank arm is keyed to shaft 65 which projects through the exterior wall of the column as shown in Figure 1 and there provided with a manual operating lever 66. This lever is adjacent the front side of the column for easy access thereto and movement backward will effect engagement of the spindle clutch and forward movement to the position shown will effect disengagement thereof.

A feed and rapid traverse transmission for power actuation of the table has been provided which is actuated by shaft 28 through a train of gears 67, 67' and 68, the latter being secured to the horizontal shaft 69 which projects through the forward wall of the column where it is provided with a bevel gear 70.

Attention is invited to the fact at this point that the gear 67 is integrally connected to shaft 28 for continuous rotation thereby and therefore unaffected by the position of clutch 38. If so desired the gear 67' may be reversed in its position on shaft 61 whereby it will mesh with gears 39 and 68, and the shaft 69 will then be driven through clutch 59. The clutch will then simultaneously control rotation of the spindle and movement of the work support.

Gear 70 meshes with bevel gear 71 which is splined on the vertical shaft 72 but fixed against movement therewith. In other words, the bevel gear 71 is held against axial movement by a bracket projecting from the column and the spline shaft 72 is vertically reciprocable with the knee and therefore slides relative to the gear 71. This mechanism provides a flexible coupling maintaining connection between the transmission in the knee and that shown in the column during all vertical adjustments of the work support.

Figure 6:
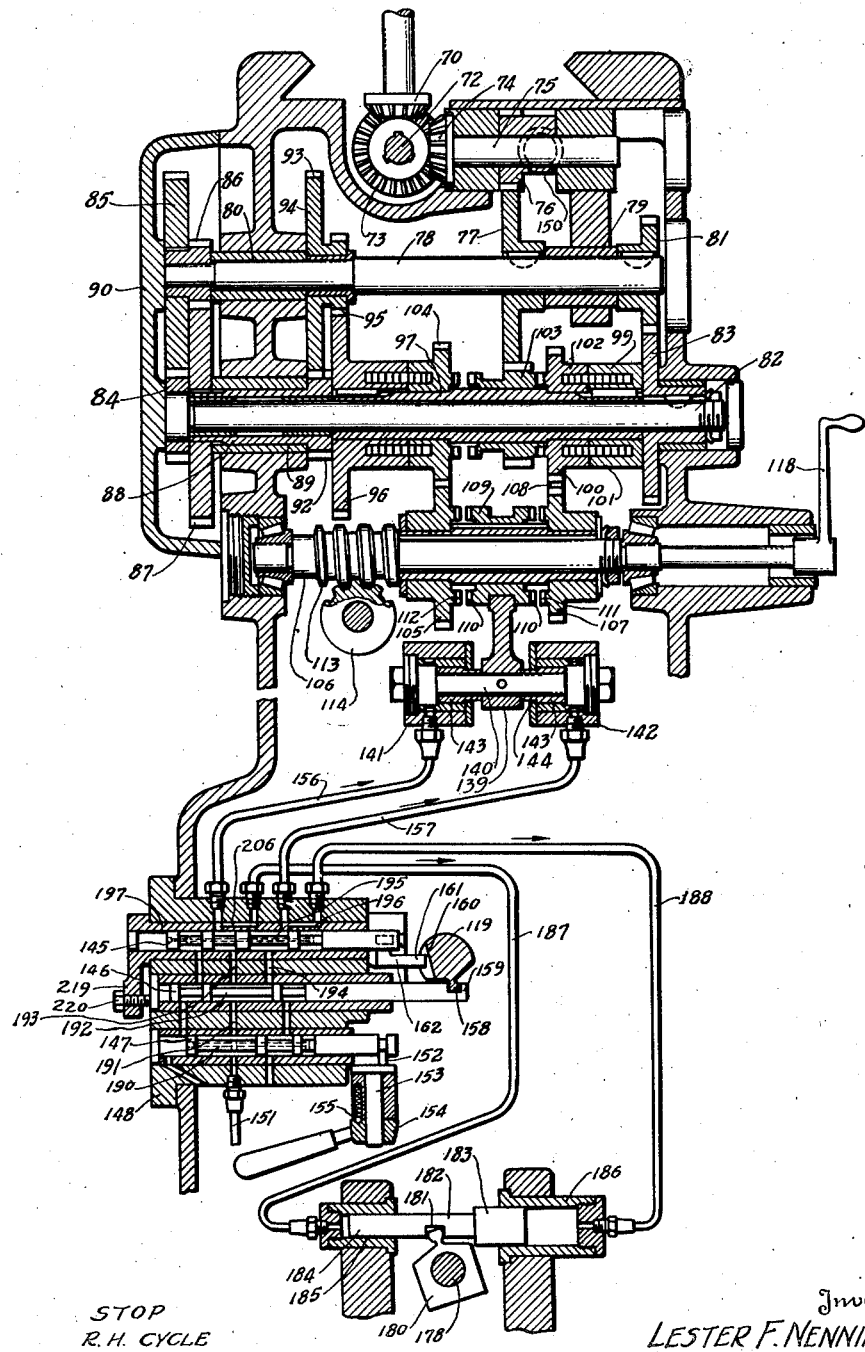
Figure 6 is an expanded view of the table transmission and control mechanism therefor.
Figure 7:
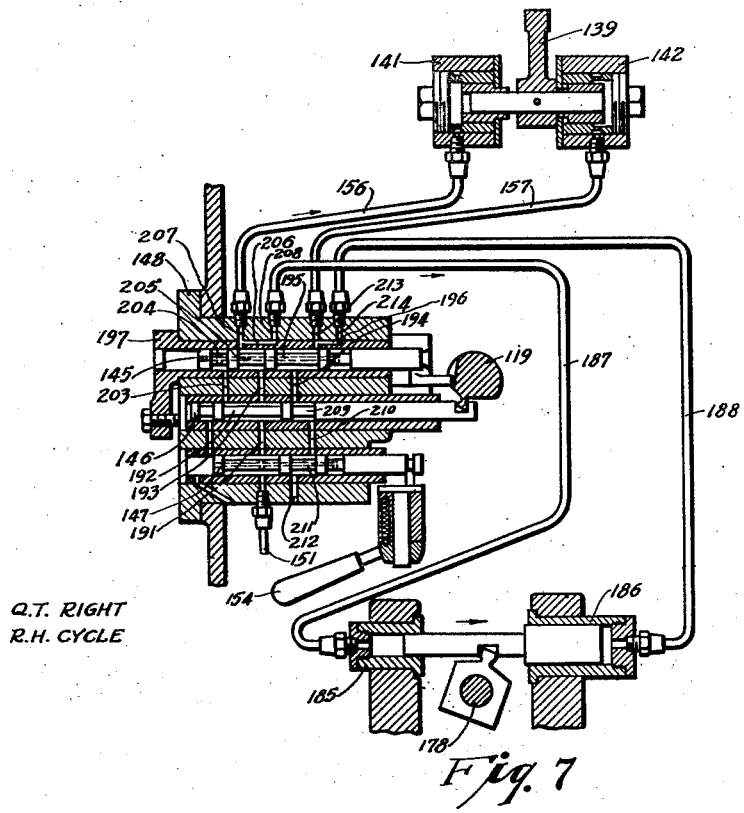
Figure 7 is a diagrammatic view showing the control mechanism in a quick traverse right position for a right hand cycle.
Figure 8:
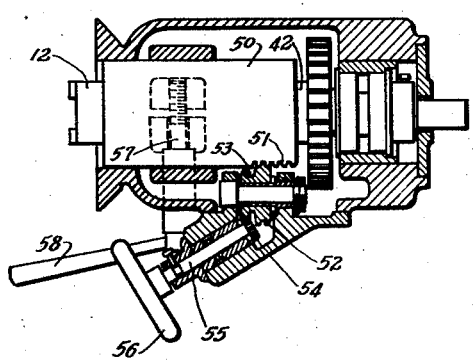
Figure 8 is a section on the line 8—8 of Figure 3.

A second bevel gear 73 is splined on the lower extremity of shaft 72 in mesh with bevel gear 74, Figure 6, keyed to the end of a short shaft 75 which carries the pinion gear 76. This pinion meshes with gear 77 keyed to the shaft 78 which is journaled in bearing 79 in one side of the knee and bearing 80 in the other side wall of the knee. Keyed to the shaft 78 on the opposite side of the journal 79 is a gear 81 which may be considered as the feed gear while the gear 77 may be considered as the rapid traverse gear. In other words the transmission divides at this point into a feed transmission and a rapid traverse transmission.

The feed transmission comprises the following mechanism. A shaft 82 is journaled in the knee parallel to the shaft 78 and has keyed to one end the spur gear 83 meshing with the feed gear 81. A change gear 84 is keyed to the other extreme end of shaft 82 for driving a train of change gears 85, 86 and 87, the latter being keyed to a sleeve 88 which is journaled in the bearing 89 for independent rotation relative to the shaft 82. The gears 85 and 86 constitute a gear couplet and are mounted for free rotation on the end of shaft 78 which projects beyond the end of bearing 80. These change gears 84, 85 and 86 and 87 are on the outside wall of the knee and therefore a cover plate 90 has been pivotally connected at 91 to the side of the knee for enclosing the same while permitting easy access thereto for changing the same. By means of these pick-off gears which constitute a rate change mechanism the feed rate of the table may be varied within the limits of the gear sizes which may be substituted for those shown.

A second gear 92 is secured to sleeve 88 in mesh with gear 93 of gear couplet 94 loose on the shaft 78, the other gear 95 of the couplet meshing with the large gear 96. The gear 96 is keyed to the end of sleeve 97 which extends lengthwise of the shaft 82 into abutting relation with the gear 83. Keyed to this end of the sleeve is a drive member 99 which is connected to the gear 100 by means of a suitable known type of overrunning friction clutch 101. In the present instance, this clutch comprises a coiled spring, one end of which is connected to the drive member 99 and the other end frictionally engaging the hub 102 projecting from the side of the gear 100. The coiled spring is so wound that rotation of the member 99 relative to the gear 100 will cause unwinding of the spring and therefore enlargement of its external diameter which will frictionally engage the interior of the hub 102 and cause rotation of the gear 100 with the member 99 at a feed rate. If now while the parts are thus connected, or in other words while the gear 100 is being rotated by the member 99, it is connected on the opposite side to the rapid traverse clutch member 103 rotating at a higher rate of speed than the member 99 but in the same direction, the gear 100 will be rotated at a faster rate than the member 99 or in other words at a rapid traverse rate and the frictional engagement between the hub 102 and the periphery of the spring will cause the same to wind up thereby slightly reducing its external diameter causing slippage to take place between the gear 100 and member 99. This constitutes an over-drive clutch whereby the gear 100 while rotating at a slow feeding rate may be selectively rotated at a rapid traverse rate without disconnecting it from the feed train.

A second gear 104 is mounted for free rotation on the sleeve 97 adjacent the hub of gear 96 and a similar overrunning type of friction clutch may be inserted in the hubs of gears 96 and 104 whereby the latter may be rotated at a feed rate from gear 96; or through the over-drive arrangement may be rotated at a rapid traverse rate by engagement with the clutch member 103 driven by the rapid traverse gear 77 without disconnecting gear 104 from its feed train. By means of this construction it will be seen that the gear 103 constitutes a rate determining clutch in that either the gear 100 or the gear 104 may be rotated at either a feed rate or at a rapid traverse rate depending upon the axial position of gear 103 but attention is invited to the fact that the gear 103 has no neutral position and therefore in all cases one of the gears will be rotating at a feed rate and the other will be rotating at a rapid traverse rate.

The gear 104 meshes with gear 105 mounted for free rotation on the shaft 106 anti-frictionally journaled at opposite ends in the walls of the knee. The gear 100 is operatively connected to the gear 107 also mounted for free rotation on the shaft 106 by means of an idler gear 108 which causes reverse rotation of gear 107 relative to gear 105. A reverser clutch 109 may be interposed between these gears to determine the direction of rotation of shaft 106, the clutch having teeth 110 upon opposite ends selectively engageable with clutch teeth 111 formed on the face of gear 107 or clutch teeth 112 formed on the face of gear 105. The clutch 109 is keyed to the shaft 106 and is capable of being moved to a neutral position so that the shaft 106 may be rotated either clockwise or counter-clockwise; or by movement of the clutch to a neutral position rotation of the shaft may be stopped. The shaft 106 therefore forms a common drive shaft which is connected to the table by means of the following mechanism.

A worm 113, fixed to the end of shaft 106, meshes with a worm gear 114 which is keyed to the end of a short shaft 115, Figure 1, upon the upper end of which is secured a pinion 116 meshing with the rack 117. The rack is secured to the under side of the table and by means of the foregoing transmission it will be seen that by proper positioning of the clutches 103 and 109 the table may be translated at a feed rate or a rapid traverse rate; or if desired the table may be stopped by moving the clutch 109 to a neutral position. This constitutes the power transmission to the table. The table may also be manually adjusted while the clutch member 109 is in a neutral position by means of an operating handle 118 attached to the projecting end of shaft 106 as shown in Figure 2.

At this point, attention is invited to the practice followed in productive milling operations and more particularly to what is known as a one-way automatic cycle. In automatic milling where a plurality of similar work pieces are to have the same operation performed thereon, a suitable fixture is provided for holding the work on the table of the machine. The table is started by the operator after fixing a work piece thereto, and it automatically carries the work past the cutter for machining, returns the same to starting position and stops. The operator changes the work piece, starts the machine and it performs another cycle.

In such an operation, it is of course apparent that it is desirable for the work to be moved up to the cutter in a short a time as possible or in other words at a quick traverse rate, after which the movement of the table is automatically changed to a feed rate. The point at which this change occurs may be at any point along the length of the table depending upon the position of the work, or if two work pieces are spaced on the table for sequential or intermittent milling there will be a plurality of points at which the table rate will change. After the milling operation or operations have been completed on one or more work pieces, a suitably positioned trip dog will reverse the direction of table movement and the table will return at a quick traverse rate to the starting position.

In a one-way cycle there is no feeding movement possible during the quick traverse rate of the table and therefore this name is chosen to distinguish from a reciprocating cycle in which feed is available during movement of the table in both directions. There are two different one-way cycles; that is, a left hand one-way cycle and a right hand one-way cycle. This comes about by reason of the fact that due to the direction of rotation of the cutter or for other reasons, it may be desirable to load the table at the left hand side of the machine relative to the cutter so that the table will have a feeding movement toward the right, or it may be desirable to load the table at the right hand side of the machine and feed the same toward the left.

The machines of the past are usually provided with either one or the other of these one-way cycles due to the fact that if a four-position control plunger is used, it only has four possible positions; and therefore if those four positions are utilized as for quick traverse left, feed left, quick-traverse right and stop, there is no additional position left to provide a feed right control. In the present machine, however, means have been provided whereby making a simple adjustment, the four positions of the plunger may be so chosen as to yield either type of one-way cycle. The control mechanism which makes this conversion possible will now be described.

The clutch 103 is shifted by mechanical means while the clutch 109 is shifted by hydraulic means comprising the following mechanism. A trip plunger 119 is rotatably and reciprocably mounted in the forward part of the knee adjacent the front side of the table for dog actuation thereby, this plunger having four positions; that is, while raised it may be oscillated either clockwise or counter-clockwise by dog movement constituting two positions; or lowered and oscillated counter-clockwise or clockwise comprising two more positions. The clutch 103 is mechanically connected to the plunger for shifting thereby during upward or downward movement, the direction of movement determining the ultimate position of the clutch. This movement remains the same irrespective of whether the machine is operating in a left hand cycle or a right hand cycle.

Figure 15:
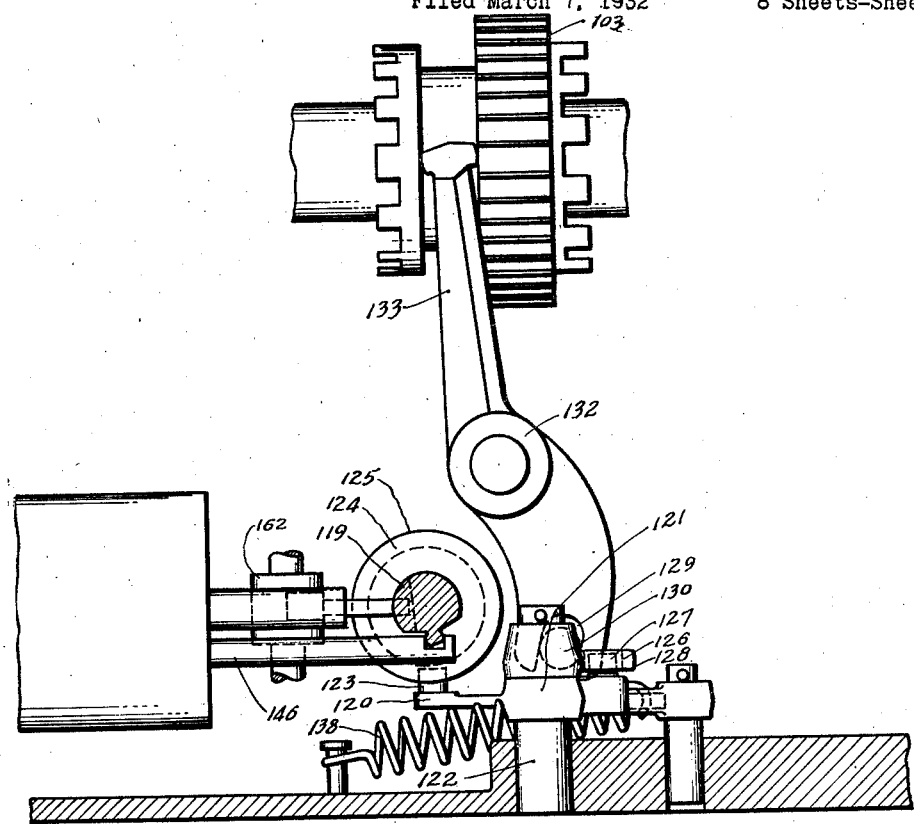
Figure 15 is a plan view of the trip control plunger and connections therewith.
Figure 16:
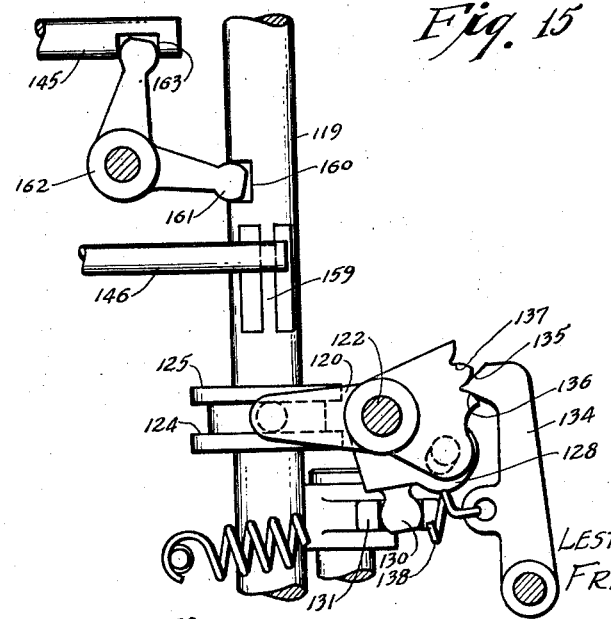
Figure 16 is an elevational view of the parts shown in Figure 15.

The mechanism by which the clutch 103 is connected to the plunger is shown in Figures 15 and 16 and comprises a bell crank 120 pivotally mounted at 121 on the pin 122 projecting from the wall of the knee, the crank having a pin 123 projecting into a groove 124 formed in the collar 125 integrally connected to the plunger. The opposite end of the crank has a pin 127 projecting into a bore 126 formed in the end of a bell crank 128 which is also mounted for free rotation on the pin 122. The pin 127 has a certain amount of lost motion on its connection with the crank 128. The other arm 129 of the bell crank is provided with a ball-shaped end 130 which fits in the forked end 131 of shifter fork 132 which has its opposite end 133 bifurcated to engage the spool of the clutch 103. A well-known type of load and fire mechanism is utilized to insure that the parts will be completely shifted upon movement by the plunger and comprises the pivoted lever 134 having the detent 135 engageable with the notches 136 and 137 formed on the member 120. A spring 138 is attached to the end of the lever 134 and secured at the other end to the wall of the knee to insure firing of the parts after dog movement to the half-way point.

The clutch 109 is hydraulically shifted by means of the shifter fork 139, Figure 6, secured to the piston rod 140 which is slidably mounted in cylinders 141 and 142. The piston slides in neutralizing sleeves 143 which are slidably mounted in the cylinders and provided with shoulders 144 whereby upon the admission of pressure to both cylinders the shoulders on the sleeves will engage the cylinder heads while the ends of the sleeves will engage opposite sides of the shifter fork thereby moving the same to a neutral position irrespective of its former position.

The mechanism for controlling the admission of pressure to the cylinders 141 and 142 comprises a valve plunger 145, a directional control valve plunger 146 and a stop valve plunger 147, all of which are reciprocably mounted in a valve block 148 secured in the wall of the knee. Pressure is supplied to these valves from a pump 149, Figure 3, which may be of any type of constant delivery pump such as a gear pump or plunger pump, the latter being found suitable in the present instance and is driven from an eccentric 150 keyed to the shaft 75, Figure 6. The pump is mounted in the bottom of the knee which serves as a reservoir and from which oil is drawn and forced through channel 151 to the valve block 148 as shown in Figure 6.

The stop valve plunger 147 is axially shifted by manual means comprising an eccentric pin 152 carried on the end of a rotatable shaft 153 which projects through the forward wall of the knee and there provided with a manual control lever 154. A spring pressed ball 155 may be provided as a detent to maintain the lever and valve in either shifted position. Movement of this valve to the left from the position shown in Figure 6 will couple the pressure line 151 with both of the channels 156 and 157 extending respectively to cylinders 141 and 142. By means of this mechanism the machine may be stopped at any point in its cycle as for the purpose of calipering the work or in case of any emergency.

The directional control valve plunger 146 is provided with a socket 158 at one side thereof into which fits a ball ended lug 159 projecting from the side of the control plunger 119. From Figure 6 it should be apparent that rotational movement of the plunger 119 will effect axial shifting of the directional control plunger which determines the position of clutch 109 and thereby the direction of movement of the table. The plunger 119 also has a segmental groove 160 formed in the side thereof into which fits the end 161 of a bell crank 162 the other arm of which engages a socket 163 formed in the end of the secondary directional control valve plunger 145. Upward and downward movement of the plunger 119 will therefore effect axial shifting of the plunger 145 which acts to change the coupling of the ports in the valve block.

In the operation of milling machines it is desirable that means be provided to prevent feeding of the table while the cutter is stopped as it may cause damage thereto. Means have therefore been provided to cause automatic engagement of the spindle clutch and thereby rotation of the spindle when feed movement of the table is initiated, and disconnection of the spindle clutch when the table is moved at a rapid traverse rate, or when the table is stopped. This mechanism acts conversely to prevent engagement of the spindle clutch only and at such times as when the table is moving at a rapid traverse rate. This is accomplished by providing a rotatable shaft 164 mounted in the column and provided at the upper end with an integral pinion 165 engaging rack teeth formed in the shifter rod 61.

A crank arm 166 is secured to the lower end of rod 164 and connected to a similar crank arm 167 by means of the link 168. The crank arm 167 is keyed to the end of the rotatable sleeve 169 which has a plurality of circumferentially extending grooves 170 spaced about its interior bore 171. A splined sleeve 172 is slidably mounted in the interior of sleeve 169 the splines 173 fitting the circumferential slots 170 with a large amount of lost motion. The sleeve 172 has an annular groove 174 formed in its perpihery engaged by an eccentric pin 175 on the end of the rotatable shaft 176 having a knurled hand wheel 177 on the end thereof. The sleeve 172 has a splined bore by which it is fitted to the splined shaft 178, this shaft being rotatably mounted in the knee and movable up and down therewith.

When the sleeve 172 is moved to its upper position by means of the pin 175 it may be rotated in a counter-clockwise direction without effecting movement of the exterior sleeve 169. In other words when the sleeve 172 is in an upper position the spindle stop is disengaged from positive movement but an interlock arrangement still exists to prevent disengagement of the spindle clutch without first stopping the table feed. When the table and spindle are stopped the parts are in the position shown in Figure 5 and the spindle stop is disengaged. If the clutch lever 66 is now moved to engage the clutch, the outer sleeve 169 will be rotated in a clockwise direction and the shoulder 179 will move away from the spline 173 on the sleeve 172. This permits rotation of the spindle while the table is stopped. If now the table feed is engaged, the sleeve 172 will be rotated in a clockwise direction, and the spline 173 will follow up the movement of shoulder 179 until the parts are again in the position shown in Figure 5. But upon return movement in a counter-clockwise direction it will be seen that the table feed must be disconnected first or otherwise the disconnection of the spindle clutch will cause the shoulder 179 to engage the spline 173, the two moving simultaneously together to disconnect table feed and stop the spindle.

Rotation of the shaft 176 will cause the sleeve 172 to move downward so that the splines 173 will fit the grooves formed in the sleeve 169 locking the two together for simultaneous movement. In this position the spindle stop is engaged and the lever 66 is practically never used because the spindle engagement is under the control of the table actuating mechanism.

As shown in Figure 6 the shaft 178 is provided with a ball ended lever 180 engaging a socket 181 formed in the side of piston rod 182 having pistons 183 and 184 on opposite ends which are slidably mounted in cylinders 185 and 186. Attention is invited to the fact that the piston 183 is larger in diameter than the piston 184 and therefore when pressure is admitted to both cylinders, the projected area of piston 183 being the larger, it will receive the greater pressure rotating shaft 178 in a counter-clockwise direction and the stopping of the spindle. Also if pressure is admitted to cylinder 186 and exhausted from cylinder 185 a similar result will follow. If, however, pressure is admitted to cylinder 185 and exhausted from cylinder 186, the shaft 178 will be rotated in a clockwise direction and the spindle clutch will then be engaged. From this it will be seen that when pressure is admitted to cylinder 186 or pressure admitted to both cylinders that the spindle clutch will be disengaged while if pressure is admitted to cylinder 185 and exhausted from 186 the spindle clutch will be disengaged. Each of these cylinders is connected to the valve block by channels 187 and 188.

In order to better understand the operation of the machine reference may be had to Figures 6, 7, 9 and 10 which show the positions of the various valves during the performance of a right hand feed cycle. In Figure 6 the parts are shown in a stop position; in other words the table and spindle are stopped, the table being in a left hand position as shown in Figure 11 of the drawings. The control plunger is in an upward position to which position it was moved by dog 189 carried by the table. In this position of the parts the fluid from channel 151 flows through the cannelure 190 of plunger 147 to channel 191 leading to the primary directional control valve. An elongated groove 192 in the plunger 146 divides the flow to channel 193 leading to operating cylinder 141 of clutch 109 and channel 194 which through the cannelure 195 of valve plunger 145 directs the pressure to channel 157 leading to the other clutch operating cylinder 142. The axial groove 206 formed in the valve sleeve 197 couples channel 187 with channel 156 and annular groove 196 couples channel 188 with 157 so that pressure is simultaneously admitted to both ends of the spindle clutch actuating cylinders 185 and 186. It will now be noted that pressure is admitted to both ends of the directional control clutch actuating cylinders. All of the channels are therefore under pressure which means that the clutch 109 is in neutral poistion and the spindle clutch is disengaged.

In order to start the machine the operator moves the starting lever 198 to the left, this lever being mounted for universal movement in a block 199, Figure 3, mounted in the front of the knee and provided with a ball ended arm 200 engaging a socket 201 formed in the periphery of a collar 202 integrally secured to the plunger 119. A movement of this lever to the left will effect rotation of the plunger 119 in a counter-clockwise direction to the position shown in Figures 7 and 17. This will cause longitudinal movement of the valve plunger 146 to the left while the other valves remain in the same position. The pressure from channel 151 flowing through channel 191 will now be conducted by means of the longitudinal groove 192 in plunger 146 to channel 203 which is closed off by the annular groove 204 in plunger 145, and to channel 193 which by means of the annular groove 205 will conduct fluid pressure to channel 156. A groove 206 formed in the periphery of the sleeve 197 connects port 207 of channel 156 with port 208 of channel 187 so that the pressure will also flow to cylinder 185 which in turn will cause rotation of the shaft 178 causing engagement of the spindle clutch, the cylinder 186 being connected to reservoir through channel 188, port 214, groove 196, cannelure 195 channel 194, cannelure 209, channel 210, and cannelure 211 coupled to exhaust port 212 through valve plunger 147.

Since the port 213 of channel 157 and port 214 of channel 188 are connected together by groove 196 both of these channels will be connected to reservoir. This will shift the clutch 109 to the right as viewed in Figure 6 and since the clutch 103 is in engagement with gear 100 due to the fact that the plunger is up the final shaft 106 of the table transmission will be rotated at a rapid traverse rate causing movement of the table toward the right as viewed in Figure 17. Continued movement of the table will cause engagement of dog 215 with the lug 216 projecting from the rear of the plunger causing downward movement thereof and shifting of the valves to the position shown in Figure 10.

Since the plunger is only moved downward the valve plunger 146 will remain in the same position while the plunger 145 will be moved to the right as viewed in that figure. This new position of plunger 145 will connect channel 203 with cannelure 204 and channels 156 and 187 while fluid in both channels 157 and 188 will be connected to reservoir by line 194. Admission of pressure to cylinder 185 and exhaust from cylinder 186 which will cause rotation of shaft 178 and thereby engagement of the spindle clutch causing rotation of the cutter during feed of the table. It will be noted that pressure is still being admitted to channel 156 while channel 157 is connected to reservoir and therefore the position of clutch 109 remains unchanged; but upon reference to Figures 15 and 16 it will be noted that downward movement of the plunger effects mechanical shifting of clutch 103, thereby disconnecting the rapid traverse drive from gear 102 and permitting the feed drive member 99 to rotate gear 102 and thereby move the table at a feeding rate toward the right.

At the completion of the feeding movement a reverse dog 217 attached to the table will engage the wing 218 of the trip plunger rotating the same from the position shown in Figure 10 to the position shown in Figure 9. This will effect movement of the valve plunger 146 to the right connecting channel 203, channel 156, and cylinder 141 to reservoir while admitting pressure to channel 194 and thereby to channel 157 and cylinder 142 to effect shifting of the clutch member 109 to the left as viewed in that figure. Since the rapid traverse clutch member has already been connected to the gear 104 during the previous movement it will be seen that the coupling of clutch 109 with gear 105 will permit the rapid traverse rate in the opposite direction causing quick return to the left.

Pressure will also be admitted to channel 188 and cylinder 186 thereby rotating shaft 178 to effect disconnection of the spindle clutch which will stop rotation of the cutter during the return quick traverse movement of the table. As the table reaches the limit of its return travel, dog 189 will again engage the plunger to raise the same and move the parts again to the position shown in Figure 6 which has already been described and in which position the table and spindle are stopped.

As previously mentioned it may be desirable to load the work table at the right hand side of the machine and have the table feed to the left rather than feed to the right. If this is desired the cycle control valve sleeve 197, provided with operating lever 219, may be rotated from the position shown in Figure 1 through an angle of approximately 90 degrees and secured in position by bolt 220 engaging the detent 221 formed in the end of the valve block 148. This new position of the cycle control valve sleeve is shown in Figures 11, 12, 13 and 14. This changes the stop position of the plunger from the position shown in Figure 6 to the position shown in Figure 12, the plunger in Figure 12 being in a downward position while the plunger as shown in Figure 6 is in an upward position. Attention is invited to the fact that the grooves 206 and 196 in the sleeve 197 are moved out of registry with ports 207, 208, 213 and 214 and that these ports are coupled together in new combinations, the groove 225 communicating only with port 207, the groove 226 coupling together ports 208 and 213, and groove 227 communicating with port 214. An axial bore 228 extends through valve plunger 145 and has radial ports at opposite ends opening into cannelures 204 and 229 of the plunger. This bore serves to couple ports 207 and 214.

As shown in Figure 2 and assuming the table to be moving toward the right the plunger will be moved down to a stop position by the dog 222. In order to start the machine the plunger would be rotated by the control lever 198 to the position shown in Figure 11, the pressure now flowing to channel 157 and 187 to cause shifting of clutch 109 to the left while the clutch 103 is engaging the gear 104 due to the downward position of the plunger. This will cause a rapid traverse movement of the table toward the left with the cutter rotating.

As the cutter approaches the work a dog 223, Figure 2, will engage the plunger to raise the same positioning the valves as shown in Figure 13, thereby shifting the clutch spool 103 to the right which permits the feed drive gear 96 to rotate shaft 106 without changing the position of the other parts. Upon completion of the feeding movement, the reverse dog 224 will engage the wing 218 on the trip plunger rotating the same to the position shown in Figure 14 thereby shifting the directional control plunger 146 causing the admission of pressure to cylinder 141 and also to cylinder 186 thereby connecting the rapid traverse gear 103 to shaft 106 and through shaft 178 disconnecting the clutch spindle and stopping rotation of the cutter.

A milling machine of simplified form has thus been provided having an improved transmission with automatic control therefore, capable of yielding left hand or right hand one-way cycles at the will of the operator together with automatic spindle control for both cycles which relieves the operator of further attention to spindle rotation once the proper cycle has been selected; or if so desired the spindle control may be disconnected permitting more independent operation of the machine, but even then sufficient interlocking exists between the parts to protect the same from damage due to lax operation all of which adds flexibility to the adjustment and control thereby producing a machine of high efficiency and suitable for universal application.

We claim:

1. A milling machine having a column, spaced vertical guideways formed on a face of the column, a knee reciprocably mounted upon said guideways, a table movable transversely of the knee, a prime mover mounted in the column, a variable feed transmission mounted in the knee, motion transmitting means coupling the prime mover to the transmission including a shaft power actuated by the prime mover projecting from the column between said guideways, said feed transmission including a plurality of shafts extending transversely of the knee and projecting through a side wall thereof, rate change gears mounted on the projections of said shafts, a cover plate enclosing said gears, said plate being removable to vary the speed ratio coupling between said shafts and thereby the feed rate of the table.

2. A milling machine having a column, a knee adjustably mounted upon the column, a table reciprocably mounted upon the knee, a transmission for the table including a power shaft journaled in the knee, a first shaft extending transversely of the knee, a pair of spaced clutch gears mounted for free rotation on the shaft and fixed against axial movement, a shiftable clutch gear also mounted on the shaft for free rotation intermediate said first named clutch gears, means to drive the first clutch gears normally at a feed rate, means to drive the shiftable clutch gear at a rapid traverse rate, a second shaft journaled in the knee having a pair of gears thereon operatively coupled with the first clutch gears for rotation thereby in opposite directions and at a feed rate, and means to shift the shiftable clutch gear into engagement with either of said first clutch gears to effect rotation of the second shaft at a rapid traverse rate.

3. A transmission for a milling machine having a column, a knee reciprocably mounted on the column, a table movable transversely of the knee, means to effect said movement including a power shaft journaled in the knee, a first shaft extending transversely of the knee, a pair of clutch gears mounted for free rotation on the shaft, a feed transmission actuated by the power shaft, overrunning clutches coupling the feed transmission to said gears, a shiftable member mounted on the shaft for actuation by the power shaft at a rapid traverse rate, means to shift said member into engagement with either of said clutch gears for rotation at a rapid traverse rate, a second shaft, a pair of gears loosely mounted on said shaft and operatively coupled to the clutch gears for rotation in opposite directions, motion transmitting means coupling the second shaft to the table, a reversing clutch mounted on the second shaft for opposite movement into engagement with the gears thereon for determining the direction of movement of the table, said second shaft projecting through the side of the knee and a manual control lever mounted on said projection for effecting manual rotation of the shaft when the reverse clutch is in neutral position and thereby manual adjustment of the table.

4. A milling machine having a column, a knee adjustably mounted upon the column, a table reciprocably mounted upon the knee, a transmission for the table including a power shaft journaled in the knee, a first shaft extending transversely of the knee, a pair of spaced clutch gears mounted for free rotation thereon, overrunning clutches coupling said gears to the power shaft for rotation thereby at a feed rate, a table drive shaft, a pair of final gears on the drive shaft operatively coupled to the clutch gears for rotation in opposite directions and normally at a feed rate, a shiftable gear mounted on the first shaft intermediate the clutch gears and operatively coupled to the power shaft for rotation at a rapid traverse rate, means to couple the shiftable gear with either clutch gear to effect rotation of the final gears at a rapid traverse rate, and means to selectively couple the final gears to the table drive shaft to determine the direction of table movement.

5. A milling machine having a column, a knee adjustably mounted upon the column, a table reciprocably mounted upon the knee, a transmission for the table including a power shaft journaled in the knee, a first shaft extending transversely of the knee, a pair of spaced clutch gears mounted for free rotation thereof, overrunning clutches coupling said gears to the power shaft for rotation at a feed rate, a table drive shaft, a pair of final gears on the drive shaft operatively coupled to the clutch gears for rotation in opposite directions and normally at a feed rate, a shiftable gear mounted on the first shaft intermediate the clutch gears and operatively coupled to the power shaft for rotation at a rapid traverse rate, means to couple the shiftable gear with either clutch gear to effect rotation of the final gears at a rapid traverse rate, a direction determining clutch for selectively coupling either final gear to the table drive shaft, means to move the clutch to a neutral position, and manual means for rotating said final shaft when said clutch is in a neutral position.

6. A milling machine having a column, a knee adjustably mounted upon the column, a table reciprocably mounted upon the knee, a transmission for the table including a power shaft journaled in the knee, a first shaft extending transversely of the knee, a pair of spaced clutch gears freely rotatable thereon, overrunning clutches coupling said gears to the power shaft for rotation thereby at a slow rate, a table drive shaft, a pair of final gears on the drive shaft operatively coupled to the clutch gears for rotation thereby in opposite directions and normally at a slow rate, a shiftable gear mounted on the first shaft intermediate the clutch gears and operatively coupled to the power shaft for rotation thereby at a fast rate, means to couple the shiftable gear with either clutch gear to effect rotation of the final gears at a fast rate, a direction determining clutch for selectively coupling either final gear to the table drive shaft, said shaft having an extension projecting through the side of the knee, and a control lever mounted on said extension for effecting manual adjustment of the table when the direction clutch is in neutral position.

7. A milling machine having a support, a slide reciprocably mounted upon said support, a power transmission for said slide including rate and direction determining clutches, a trip controlled plunger, mechanical linkage coupling the plunger to said rate clutch for effecting shifting thereof, hydraulically actuated means for shifting said direction determining clutch, a control valve therefor, and means coupling the control valve to the plunger for determining operation thereof.

8. A milling machine having a support, a slide reciprocably mounted upon said support, a power transmission therefor including rate and direction determining clutches, a reciprocable and oscillatable trip controlled plunger, said plunger being oscillatable to two positions, hydraulically actuated means for shifting said direction clutch, a control valve therefore, means to couple the valve to the plunger for actuation thereby upon positioning of the valve in one of said positions to effect movement of the table, trip means effective after predetermined movement of the table to shift the plunger axially, rate clutch shifting means actuated by said axial movement to change the rate of table movement, subsequent acting trip means carried by the table to effect rotation of the plunger and thereby a change in direction of table movement, and additional trip means effective during the return movement of table to effect axial movement of the plunger in the opposite direction to neutralize the direction determining clutch and stop table movement.

9. In a transmission and control mechanism for a movable support, including a feed and a rapid traverse transmission, rate and direction determining clutches for said transmissions, a trip controlled reciprocable and oscillatable plunger, mechanical means coupling one of the clutches to the plunger for actuation thereby, hydraulically actuated means for shifting the other clutch including a source of pressure, primary directional control valve, and a secondary directional control valve coupled in series in the order named, means coupling one valve to the plunger for actuation by axial movement of the plunger and means coupling the other valve to the plunger for actuation by oscillation of the plunger.

10. A milling machine hacing a column, a knee adjustably mounted on the column, a work table reciprocable transversely of the knee, a power transmission for the table including rate and direction determining clutches, a trip controlled plunger, mechanical means coupling one of said clutches to the plunger for actuation thereby, hydraulically actuated means for shifting the other clutch, a control valve therefor operatively coupled to the plunger, a reservoir in the knee, a pump actuated by the transmission and flow channels connected to the pump for withdrawing fluid from the reservoir and forcing the same under pressure to said control valve.

11. A milling machine having a column, a knee adjustably mounted on the column, a work table reciprocable transversely of the knee, a power transmission for the table including rate and direction determining clutches, a trip controlled plunger, mechanical means coupling one of said clutches to the plunger for actuation thereby, hydraulically actuated means for shifting the other clutch, a control valve therefor operatively coupled to the plunger, a reservoir in the knee, a pump actuated by the transmission, flow channels connected to the pump for withdrawing fluid from the reservoir and forcing the same under pressure to said control valve, a stop valve interposed between the pump and control valve and means to rotate said valve to effect shifting of the direction determining clutch to a neutral position to stop movement of the table.

12. A milling machine having a movable slide, a power transmission therefor including rate and direction determining clutches, a trip controlled plunger, mechanical means coupling the plunger to said rate clutch, hydraulically actuated means for shifting the direction clutch, means controlled by the plunger to energize said hydraulically actuated means, said plunger being oscillatable to two positions to effect movement at a feed rate in only one direction and to effect only quick traverse rate in the other direction to yield a one-way feed cycle, a cycle control valve interposed between the directional control valve and said hydraulically actuated means, and means to adjust said valve to yield a one-way cycle having a feed movement in the opposite direction.

13. A milling machine having a rotatable spindle, a work support, a prime mover, a spindle clutch coupling the prime mover to the spindle, transmisson means coupling the prime mover to the work support including rate and direction determining clutches, a trip controlled plunger, means coupling the plunger to said clutches for actuation thereby to yield feed and rapid traverse rates, hydraulically actuated means for shifting said spindle clutch and a control valve actuable by said plunger when determining rapid traverse movement of the work support to effect disengagement of said clutch.

14. A milling machine having a rotatable spindle, a work table movable transversely of the spindle, a prime mover, a spindle transmission, a starting clutch coupling the spindle transmission to the prime mover, a table transmission actuated by the prime mover, rate and direction control mechanism for the table transmission, means coupling the mechanism to the table transmission to yield a feed rate in only one direction of table movement, means coupling the mechanism to the starting clutch to effect connection thereof only during said feed movement, means to change said connection between the mechanism and transmission so as to yield a feed rate only in opposite direction of table movement, and means to change the connection of the starting clutch to effect engagement of the clutch only during feed movement in the last named direction.

15. A milling machine having a rotatable spindle, a work table movable transversely of the spindle, a prime mover, a spindle transmission, a clutch coupling the transmission to the prime mover, a table transmission, control mechanism for the table transmission and spindle clutch, means coupling the mechanism to the table transmission to yield a quick traverse rate only in one direction of table movement, means coupling the mechanism to said clutch to effect disconnection of said clutch during said quick traverse movement, means to change the connection between the mechanism and transmission to yield a quick traverse movement of the table only in the opposite direction, and means to automatically change the connection of the spindle clutch to effect disengagement of the clutch during said last named quick traverse movement.

16. A milling machine having a rotatable spindle, a work table movable transversely of the spindle, a prime mover, a spindle transmission, a clutch coupling the spindle to the transmission, a feed transmission including shiftable motion transmitting means, hydraulically actuated means for shifting said clutch and said motion transmitting means, a trip actuated control valve mechanism, a cycle control valve coupling the mechanism to the shiftable means of said transmission whereby the mechanism will yield a feed rate in only one direction and only a quick traverse rate in the other direction, said means also coupling the single clutch actuating means to said mechanism for automatic engagement thereof during table feeding movements, automatic disengagement thereof during rapid traverse movements of the table, means to disconnect the clutch from positive actuation by the mechanism and interlocking means effective during said disconnection to effect engagement of the spindle clutch upon actuation of the table at a feed rate.

17. A milling machine having a column, a cutter spindle journaled in the column, spaced vertical guidways formed on one face of said column, a knee mounted on said guideways for adjustment toward and from the spindle, a work table translatably mounted on the knee, transmission means for effecting power reciprocation of the table transversely of the spindle including a prime mover mounted in the column, a rate change mechanism carried by the knee, means coupling the prime mover to the rate change mechanism including a shaft journaled in the column and projecting therefrom midway between said column guideways, a depression formed in the side of the knee adjacent the face of the column, a splined shaft journaled in the depression and extending the full length thereof, said shaft being vertically adjustable with the knee, gearing fixed against movement with the column operatively coupling said projecting shaft with the splined shaft whereby the same will be driven during all positions of adjustment of the knee, a table drive shaft and means for selectively coupling the table drive shaft to the splined shaft for rapid movement of the table or inclusive of the rate change mechanism for feeding movement thereof.

18. A milling machine having a column, a knee adjustably mounted upon the column, a table reciprocably mounted upon the knee, transmission means for effecting movement of the table including a power shaft journaled in the knee, a first shaft extending transversely of the power shaft having a first and second clutch gear mounted for free rotation thereon, a shiftable clutch member freely mounted on the first shaft intermediate the clutch gears, means to drive the clutch gears normally at a feed rate, means to drive the shiftable clutch member at a rapid traverse rate, said shiftable clutch member continuously engaging one or the other of the clutch gears, a second shaft journaled in the knee having spaced gears thereon, a first train coupling the first clutch gear to one of said spaced gears for rotation in one direction, a second train coupling the second clutch gear to the remaining spaced gear for rotation in an opposite direction, one of said spaced gears being rotated at a rapid traverse rate, a final train extending to the table and a shiftable clutch member interposed between the spaced gears for selectively coupling the table train thereto, and means to shift said gear independent of the shiftable clutch gear to simultaneously change the rate and direction of movement of the table.

19. A milling machine having a support, a slide reciprocably mounted upon the support, a transmission for effecting power movement of the slide including a pair of clutches for determining the rate and direction of said movement, a reciprocable and oscillatable trip controlled plunger, means carried by the slide for automatically actuating said plunger, said plunger being oscillatable to a first and second position, hydraulically actuated means for shifting one of said clutches to change simultaneously the rate and direction of movement of the slide, a control valve therefor, means to couple the valve to the plunger for actuation thereby, manual means for moving the plunger to one of said positions to effect movement of the support, trip means carried by the support and adjustable to effect axial shifting of the plunger after predetermined movement thereof, trip means actuated by the axial movement of the plunger to shift the other clutch, and thereby change the rate of table movement, additional trip means carried by the slide to effect rotation of the plunger to its second position to thereby change the rate and direction of movement of the slide, and subsequently acting trip means effective during the return movement of the slide to effect axial movement of the plunger in the opposite direction to stop the movement of the table.

20. A milling machine having a column, a cutter spindle rotatably movable in the column, a work support supported by the column for movement transversely of the spindle, transmission means for effecting said movements including a prime mover, a clutch having one portion constantly driven by the prime mover, a drive gear on said portion and constantly rotated thereby a first branch train for effecting one of said movements, a shiftable clutch member coupled to said branch transmission and engageable with the constantly rotated clutch portion for coupling the first branch to the prime mover, a second branch transmission for effecting the other movement including an initial drive shaft therefor, a gear detachably mounted on said shaft in a first position engaging the first clutch drive gear for effecting actuation of the second branch transmission exclusive of the clutch; or in a second position in engagement with the second clutch drive gear for actuation of the branch transmission inclusive of the clutch.

21. In a machine tool having a movable support, the combination of transmission means for effecting movement of the support including a shiftable clutch member having a first and second position for determining respective opposite directions of movement and an intermediate position for terminating movement of the support, fluid operable means for shifting said clutch to its various positions including a pair of hydraulic motors and control valve mechanism for determining operation of said motors including a pair of longitudinally shiftable valves arranged in series between a source of pressure and said motors, said valves collectively having a first position for actuating one hydraulic motor, a second position for actuating the second hydraulic motor to thereby determine the different directions of movement of the support, and a third position for actuating both motors to terminate movement of the support.

LESTER F. NENNINGER.
FRED A. HASSMAN.